Jan. 2, 1951 O. H. SCHADE 2,536,857

HIGH-EFFICIENCY CATHODE-RAY DEFLECTION SYSTEM

Filed May 24, 1949

INVENTOR
Otto H. Schade
BY
[signature]
ATTORNEY

Patented Jan. 2, 1951 2,536,857

UNITED STATES PATENT OFFICE 2,536,857

HIGH-EFFICIENCY CATHODE-RAY DEFLECTION SYSTEM

Otto H. Schade, West Caldwell, N. J., assignor to Radio Corporation of America, a corporation of Delaware Application May 24, 1949, Serial No. 95,096

22 Claims. (Cl. 315—27)

Figure 1:
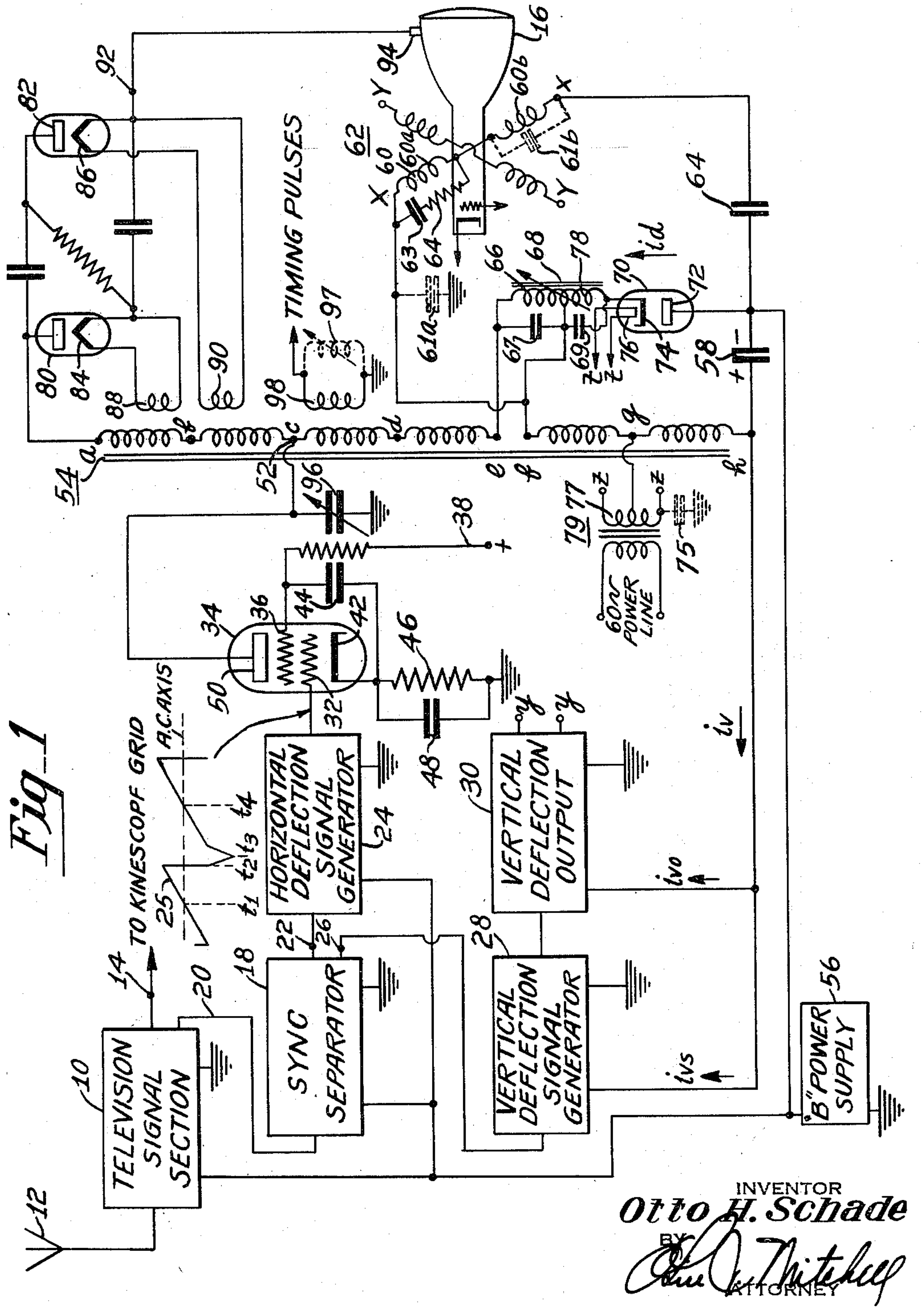

The present invention relates to improvements in cathode ray beam deflection systems, and more particularly to high efficiency reaction scanning power recovery circuits for use with cathode ray tubes of the type suitable for image scanning and reproduction.

The present invention deals more directly with a versatile and economical deflection system, especially suited for use in television receiver circuits wherein it is desirable to most efficiently extract and transform energy from the deflection circuit into "B" boost energy as well as unidirectional potential energy suitable for use as cathode ray beam accelerating potential.

Resulting from the contemporary rapid growth of the television industry and the consequent demand by the public for television receiving apparatus giving high quality performance at minimum cost, there has been marked effort on behalf of those engaged in the design of television circuits to effect circuit economies wherever possible.

As is well-known by those skilled in the television art, one of the most extravagant components of television equipment is that of cathode ray beam deflection system which is commonly of the electromagnetic variety. Generally speaking, the commercial version of the electromagnetic deflection circuit is not only inefficient in itself but requires relatively large amounts of "B" power. Particularly in television receiving circuits is this latter characteristic disadvantageous since it establishes the need for a "B" power supply system of relatively high capacity and of necessarily high cost. It is for this reason that considerable effort has been extended to improve wherever possible the operating efficiency and reduce the cost of cathode ray beam deflection systems. Accordingly, numerous reaction scanning type systems have been proposed which incorporate facilities for recovering energy cyclically stored in the electromagnetic system and feeding back energy so recovered into the deflection system in the form of increased "B" potential. Such a general system is shown and described, for example, in my U. S. patent application Serial No. 593,161, filed May 11, 1945, as well as in an article appearing in vol. 8 of the RCA Review of September 1947 entitled "Magnetic Deflection Circuits" by Otto H. Schade. These systems greatly reduce the power demand on the "B" power supply system and form the basis for considerable saving in the cost of television receiver manufacture.

To effect even further economies in the overall circuits required for the operation of cathode ray tubes such as, for example, in television receivers, steps have been taken to develop the high unidirectional potential usually demanded for cathode ray beam acceleration from pulse energy extracted from the beam deflection circuits.

Although all of these higher efficiency cost reducing measures are satisfactory to a degree, there still remains well-defined room for improvement in deflection circuits themselves as well as the combination type deflection circuit which provides beam accelerating potential in addition to beam deflection. For instance, there are in current commercial use power recovery systems of the "B" boost variety having incorporated therewith a high voltage pulse step-up type output transformer which, in order to provide sufficiently high pulse step-up action, as well as deflection amplitude and linearity, have inherently high leakage reactance which necessarily imparts higher overall losses to the deflection system. To overcome these disadvantages, as well as the higher cost of such rather complex combination output transformers, considerable attention has been given to the development of direct-drive types of deflection circuits in which the magnetic deflection yoke is directly included in the anode-cathode circuit of the deflection output discharge tube.

With such direct drive arrangements, it has been found possible to derive high voltage pulses from the deflection circuit for rectification and use as beam accelerating potential, by employing a pulse step-up transformer in series with the direct drive deflection yoke. Such an arrangement is shown in a copending U. S. patent application by Simeon I. Tourshou and William E. Scull, Jr., Serial No. 56,562, filed October 26, 1948, entitled "High Voltage Power Supply."

An even later adaptation of this type of direct-drive circuit as shown in a U. S. patent application by Allen A. Barco, Serial No. 62,844, filed December 1, 1948, entitled "Power Recovery Damping System" provides a novel form of "B" boost action which as heretofore described recovers a portion of the magnetic energy cyclically stored in the magnetic system and effectively increases the "B" power supply potential to the deflection output tube.

Certain additionally desirable deflection circuit characteristics giving even higher overall efficiency were then developed and later disclosed in U. S. patent application, Serial No. 95,106, filed May 24, 1949, entitled "High Efficiency Cathode Ray Beam Deflection Systems" filed concurrently herewith by Edwin L. Clark, which shows a novel arrangement for obtaining high-voltage pulses suitable for beam accelerating potential rectification in a system not using the conventional deflection output transformer or extra pulse step-up transformer but employing in lieu thereof a simple and inexpensive electromagnetic auto-transformer. The arrangement disclosed by Clark employs an auxiliary pulse step-up winding on the same magnetic structure as the autotransformer, the stepped-up version of the retrace pulse appearing across the winding being recified by a single rectifier means to derive beam accelerating potential.

The present invention greatly reduces leakage reactance losses normally associated with auxiliary pulse step-up windings having sufficient turns to produce a step-up action allowing the use of but a single voltage rectifier means for developing necessary kinescope beam accelerating potential.

It is therefore a purpose of the present invention to provide a combination type beam deflection and beam accelerating potential generator which exhibits a marked reduction in leakage reactance losses.

In some television circuit arrangements, it is moreover desirable to employ a somewhat higher value of operating potential than normally made available by conventional low-voltage power supply. In this respect power recovered systems of the "B" boost type, as described hereinabove, are of additional value in that the energy recovered from the deflection circuit is utilized to establish a boost voltage above the available "B" power supply of several hundred volts or more. In such cases, care must be exercised to provide a voltage which is substantially free of unwanted transients or ripple components. This is particularly difficult in direct-drive type of deflection circuits or autotransformer-coupled types wherein the storage capacitor across which the "B" boost voltage is developed may well be at a circuit position having considerable "flyback" pulse components present.

In a co-pending U. S. patent application by Simeon I. Tourshou, Serial No. 90,612, filed April 30, 1949, entitled "Television Deflection Power Recovery Circuit," and a copending U. S. patent application by Edwin L. Clark et al., Serial No. 95,107, filed May 24, 1949, filed concurrently herewith, there are shown novel circuit means for respectively providing substantially ripple-free generation of "B" boost voltage which may, in conjunction with a very small amount of filtering, be used for supply of any low-current drain stage which might require the additional boost in "B" voltage. However, the amount of current permissible drawn by an external load in such instances is definitely limited to extremely low values. On the other hand, in view of the recent trend towards A. C.-D. C. television receiver circuits, it is desirable to produce such a boosted "B" source having sufficiently large current handling capabilities to provide, for example, the current demands of a vertical output deflection stage.

Therefore, it is another purpose of the present invention to provide a new and improved design for "B" boost deflection stages which permit the boosted "B" voltage developed thereby to be utilized to satisfy the "B" power requirements of stages demanding considerable current drain.

Furthermore, since in prior art "B" boost systems in which the "B" boost potential was utilized by means other than the deflection circuit itself, the current drain of such means was severely limited, it has been possible to allow the additional current drawn by the separate means to flow through the deflection yoke without having any adverse effects. However, the additional current handling capabilities of the "B" boost circuit provided by the present invention would not permit the use of this feature of the prior art systems since the additional "B" boost current permitted by the present invention in flowing through the deflection yoke would cause severe and intolerable defocusing effects.

Consequently, it is another purpose of the present invention to provide a simple and economical electromagnetic deflection circuit which has provision for developing a "B" boost voltage such that external loads imposed upon the developed "B" boost voltage will not cause defocusing of the electron beam due to unwanted external load current flow through the deflection yoke.

Additionally, in prior art deflection systems, there has usually been provided a variable inductance in shunt with a portion of the transformer winding feeding the deflection yoke which inductance could be varied to effect a control in the amplitude of deflection current produced through the yoke. This form of width control, although allowing ample control over the deflection current amplitude does impose a well-defined circuit loss in the system which measurably reduces the overall deflection efficiency.

Another object of the present invention therefore resides in the design and provision of an electromagnetic deflection circuit having a new and improved form of width control which in itself imposes substantially no loss in the deflection system.

In practically all forms of electromagnetic deflection systems, there is necessarily employed a damping device in shunt with the yoke deflection winding. In practice, this damping device comprises an electron discharge tube having at least a heater, cathode and anode, the cathode being connected with one extremity of the deflection yoke winding while the anode being connected with the other extremity of deflection winding. Since the cathode of the discharge tube is, in auto-transformer type circuits, at the "high" end of the deflection yoke, the heater element in prior art systems has been connected to the cathode in order to avoid insulation breakdown therebetween. Unfortunately, this circuit arrangement thereby places the capacity between the heater power source and ground, in shunt with the deflection yoke and considerably reduces the self-resonant frequency of the overall circuit and undesirably limits the "flyback" or retrace rate of the deflection cycle.

A still further object of the present invention accordingly resides in the provision of a novel damping circuit for a cathode ray beam deflection system in which adverse stray capacity effects of the damping device are greatly minimized.

With the advent of higher efficiency deflection circuit methods with which the present invention is concerned, has also come the ability to use and make higher "Q" deflection yokes, i. e., yokes having fewer self losses. This, of course, has effectively amplified the losses in the stray circuit capacity acting in shunt with each section of the conventional deflection yoke winding thereby causing the characteristics of the self-resonant voltage occurring across each yoke winding section to substantially differ in phase and in amplitude even when the frequencies are made the same. Thus, the simple capacitive correction across the deflection yoke winding commonly employed to reduce deflection transients is no longer sufficiently effective.

It therefore becomes another purpose of the present invention to provide an improved means for correcting high efficiency electromagnetic deflection circuit yokes for undesirable differences in stray circuit capacity losses in themselves normally productive of deflection circuit transients.

Moreover, it is a still further object of the present invention to provide a single and simple deflection circuit which harmoniously, and efficiently combines all of the advantages hereinabove set forth to provide a deflection circuit eminently adapted for high quality performance in low-cost television receiver construction.

In order to accomplish the above objects the present invention in one of its more general forms contemplates the use of an autotransformer having at least a portion of its winding connected in series with the anode-cathode circuit of the deflection output discharge tube. An electromagnetic deflection yoke is then connected in shunt with another portion of the autotransformer winding for coupling with the anode-cathode circuit of the output discharge tube. A still third portion of the autotransformer winding, not embraced by either the yoke or the output discharge tube anode-cathode circuit, is then employed in combination with the remaining windings as a source of high-voltage pulses which are subsequently rectified through a voltage doubler stage to develop a high unidirectional potential for cathode ray beam acceleration. A "B" boost storage capacitor is connected in series with the transformer and also in series with a damping device placed in shunt with the deflection yoke. The turns ratio of the autotransformer is then adjusted, as hereinafter more fully described, to permit an operating equilibrium to be evidenced by the storage capacitor when current is drawn therefrom for use by the vertical deflection output stage. By properly positioning a D. C. blocking condenser in series with the yoke, D. C. current drawn by the vertical deflection output stage is kept from defocusing the electron beam. The heater, cathode and anode of the damping device itself are respectively connected with different points on the autotransformer winding thereby to reduce the effects of damping device heater to ground capacity on the self-resonant frequency of the magnetic system.

The reduced capacitive effects obtained in the arrangement make possible the obtaining of a much higher self-resonant frequency so that a variable capacitor connected in shunt with a portion of the winding of the autotransformer acts to adjust the accelerating voltage applied to the cathode ray beam and hence the size of the raster produced by a given amplitude of the deflection current. The high Q transients effects of the improved efficiency yoke permissibly used by the present invention are then properly balanced out by inserting a suitable resistor in series with the shunt balancing capacitor across one of the deflection yoke windings.

Numerous other objects and features of the present invention, some of which together with the foregoing, will be set forth in the following description of specific apparatus embodying and utilizing the invention's novel arrangement.

It is therefore to be understood that the present invention is not limited in any way, to the apparatus shown in the specific embodiments as other advantageous application will within the scope of the present invention as set forth in the appended claims will occur to those skilled in the art after having benefited from the teachings of the following description especially when considered in connection with the accompanying drawing in which Figure 1 schematically illustrates one form of the present invention as applied to a television receiver cathode ray beam deflection system.

Turning now to the figure, there is represented by the block 10 a section of a type television receiver which may include an R. F. amplifier, an oscillator, converter, I. F. amplifier, video demodulator, video amplifier and sync clipper. Details of these circuits as well as other television receiver circuits hereinafter represented in block form will be well known to those skilled in the television art, examples of which, however, are shown in an article entitled "Television Receivers" by Antony Wright appearing in the March 1947 issue of the RCA Review.

The input of the television receiver 10 is accordingly provided with signals intercepted by an antenna 12 which are amplified by the receiver and demodulated to appear at the output 14 indicated for connection to the modulating grid or electrode of the cathode ray image reproducing tube 16. The video signals demodulated within the receiver are suitably clipped to provide horizontal and vertical sync pulses for input to the sync separator circuit 18 by a connection 20. The horizontal synchronizing pulses then appearing at the output terminal 22 of the sync separator are applied for synchronization of the horizontal deflection signal generator 24 while the vertical synchronizing pulses appearing at the sync separator output terminal 26 are applied for synchronization of the vertical deflection signal generator 28. The output of the vertical deflection generator 28 is conventionally connected for driving the vertical deflection output stage 30 while the output of the horizontal deflection signal generator 24 is applied for driving of the grid 32 of the horizontal deflection output discharge tube 34. Suitable biasing potential for the discharge tube screen 36 is supplied from a source of positive potential 38 through screen dropping resistor 40 which is in turn by-passed to the cathode 42 by by-pass capacitor 44. A self-biasing cathode resistor 46 is conventionally connected in the cathode circuit of the discharge tube 34 which resistor is by-passed by capacitor 48. Suitable means, such as variable resistance 49 connected between the source of positive potential 38 and the cathode resistance 46 are provided for establishing a predetermined operating bias for the output discharge tube 34.

According to the present invention, the anode 50 of the deflection output discharge tube 34 is connected with one terminal 52 of an autotransformer 54. The autotransformer 54 is provided with a plurality of taps *a, b, c, d, e, f, g,* and *h,* which define various predetermined impedance levels and provide various primary to secondary turns ratio connections. In order to provide biasing polarizing potential to the anode 50 of the discharge tube 34, the lower terminal *h* of the autotransformer 54 is connected with a source of "B" power supply 56 through a "B" boost capacitor 58. The horizontal deflection winding 60 of the cathode ray beam deflection yoke 62 is then connected substantially in shunt with the secondary winding section *f—h* of the autotransformer through D. C. blocking capacitor 64 and "B"-boost capacitor 58. As shown, the winding of the autotransformer 54, in addition to being tapped at a plurality of predetermined points actually comprises two galvanically separable winding sections, e. g., section *a—e* and section *f—h*, which are in fact galvanically connected by merit of the primary winding 66 of a second autotransformer 68. This connection is made between terminals $e$ and $f$ of the autotransformer. As indicated, the second autotransformer 68 is of the variable inductance variety. A damping device 70 having an anode 72, cathode 74 and heater 76 is then connected in shunt with the first autotransformer winding section $f$—$h$ and the yoke winding X—X through the winding portion 78 of the second autotransformer 68. Since the second autotransformer 68, as will later become more fully apparent, operates to control the waveform of the reproduced deflection signal, it shall be hereinafter referred to as the linearity control autotransformer. Capacitors 67 and 69 placed respectively across the primary and secondary of the linearity autotransformer act to control its resonant frequency and the waveform of the control voltage developed thereby.

The upper terminal $a$ of the autotransformer 54, as generally described hereinbefore, is connected to the voltage doubling rectifying stage comprising diodes 80 and 82 having their heaters 84 and 86 respectively excited from additional insulated windings 88 and 90 wound on the magnetic structure of the autotransformer 54. The output potential developed at the output terminal 92 of the voltage doubler stage is then applied to the beam accelerating electrode 94 of the cathode ray tube 16. A variable capacitor 96 is imposed across the autotransformer winding $c$—$h$ for the control of the resonant frequency thereof. Since this capacitor 96 changes the self-resonant frequency of the deflection system and, as hereinafter described, the magnitude of the voltage applied to the accelerating electrode 94 of the cathode ray tube 16, which in turn effects the size of the image raster, the capacitor 96 will be hereinafter referred to as a width control capacitor. An auxiliary winding 98 may be included on the autotransformer for the extraction of timing pulses for various television circuits, such as an automatic gain control system or a keyed time averaging deflection circuit of the types respectively described by Earl I. Anderson in U. S. patent application Serial No. 67,991, entitled "Automatic Gain Control Systems," filed December 29, 1948, and in U. S. Patent No. 2,358,545 to Karl R. Wendt issued September 19, 1944, entitled "Television System."

In accordance with well-known principles of reaction scanning as described, for example, in the above-referenced article "Magnetic Deflection Circuits" by Otto H. Schade in vol. 8 of the RCA Review, September 1947, the bias on the output discharge tube 34 is so adjusted that during operation the driving sawtooth 25 provided by the horizontal deflection signal generator 24 will produce anode-cathode conduction substantially only during a period corresponding to a little more than half of the deflection cycle. Considering now the specific novel operation of the invention's embodiment in the figure, it shall be assumed that the output tube 34 is thereby rendered conductive by the sawtooth 25 only during the time $t1$—$t2$, during which interval anode-cathode current will pass from the positive source of supply 56, through the diode 70, through the linearity autotransformer 68 and through the first winding section $a$—$e$ of the autotransformer 54 to the anode 50 of the output discharge tube 34. This, of course, will induce some deflection voltage and current in the second winding section $f$—$h$ of the autotransformer which will cause a substantially linear rise of deflection current to flow through the yoke 66. At the end of time 52, corresponding to the beginning of the "flyback" or retrace interval of the deflection cycle, the discharge tube 34 becomes non-conductive and the magnetic fields in the autotransformer and yoke will then collapse causing shock excited damped oscillation of the magnetic circuit at its self-resonant frequency, normally designed to be at least 4 to 5 times that of the deflection frequency. After one-half cycle of free oscillation, the voltage appearing across the horizontal winding 60 will be of such polarity to cause the diode 70 to conduct and thereby capture the energy magnetically stored in the yoke at this time. The direction of current through the diode will be in the direction of the arrow $i_d$ which will tend to charge the capacitors 58 and 64 and so that their output discharge tube anode extremity are positive with respect to the "B" power supply potential source 56. This damping current $i_d$, in accordance with well-known reaction scanning principles will, of course, provide a first portion of the current sawtooth through the yoke winding 60 which portion will substantially correspond to the time $t3$—$t4$ of the driving sawtooth 25. By the time $t4$, the horizontal discharge tube will have been rendered conductive and this time due, to the developed voltage bias across capacitor 58, the diode 70 will be cut off. This will thereby allow most of the horizontal output discharge tube anode-cathode current to flow through capacitor 64, the deflection coil 60, the linearity control transformer winding 66 and through the winding section $c$—$e$ of the autotransformer 54. Only a very small magnetizing current will therefore flow through the autotransformer winding $f$—$h$ via capacitor 58.

As will be understood by those skilled in the art, especially those having understanding of the principles set forth in the above-referenced article by Otto H. Schade entitled "Magnetic Deflection Circuits," the turns ratio of the autotransformer primary $c$—$h$ to the autotransformer secondary $f$—$h$ will desirably be adjusted so, that neglecting the connection of the vertical deflection signal generator and vertical deflection output stages 28 and 30, optimum efficiency and linearity are obtained. The average current $i_d$ through the diode will of course then be equal to the average plate current of the output discharge tube 34, because the system has to establish an equilibrium between the current taken from the capacitors 58 and 64 (which are in D. C. parallel relationship) during the conduction of the output discharge tube and the charging current to the capacitors 58 and 64 from the diode 70. The method for arriving at this value of desirable turns ratio is more fully treated under the caption "Series Power Feedback (Booster Circuit)" on page 526 of the above-mentioned September 1947 issue of the RCA Review. This ideal ratio can be shown to be equal to:

$$\text{Turns ratio (pri-sec)} = \left[ e^{-\left(\frac{\pi}{2Q}\right)} \right]^2$$

where $e$ is the base of the natural logarithm and Q equals the effective "Q" of the overall magnetic circuit at its free resonant frequency, which is approximately equal to the frequency whose period is twice the desirable retrace time of the deflection cycle.

According to the present invention the same state of equilibrium and high quality of deflection linearity may be obtained with the additional current drain on the "B" boost capacitor 58 of $i_v$, represented by the sum of the currents required by the vertical deflection output stage 39 ($i_vo$) and the vertical deflection signal generator 28 ($i_vs$), i. e., $$i_v = i_vo + i_vs$$

This is accomplished by altering the primary to secondary turns ratio by a factor equal to $$\frac{i_d}{i_d + i_v}$$

where $i_d + i_v$ represents the damper current drawn by the diode 70 under equilibrium conditions in embracing the extra current $i_v$.

Therefore, according to the present invention, the theoretically proper turns ratio between the primary and secondary for optimum linearity and "B" boost action from which the vertical deflection output stage and vertical deflection signal generator may operate can then be expressed as follows:

$$\text{Turns ratio (pri-sec)}\left[e^{-\left(\frac{\pi}{2Q}\right)}\right]^2 \frac{i_d}{i_d + i_v}$$

It follows that this additional load $i_v$ may be supplemented or replaced by other substantial current loads provided the turns ratio is adjusted as described. In practice it will be found that due to tolerances of circuit components and tubes that a primary to secondary ratio slightly lower than given by the foregoing expression can be used satisfactorily. Furthermore, any discrepancies in linearity can always be corrected to certain extent by adjustment of the amplitude and waveform of the signal 25.

It will be apparent from a consideration of the current magnitudes involved in the arrangement of the present invention that the current $i_v$, supplied to the vertical deflection output stage and deflection signal generator stage, will be sufficient to seriously defocus the electron beam if this current were allowed to pass through the horizontal deflection winding 60 of the yoke 62. It is for this reason that the yoke winding 60 is not galvanically in shunt with the autotransformer winding section $f$—$h$ but connected from an A. C. standpoint through the D. C. blocking condenser 64. This arrangement makes it possible to design the turns ratio of the autotransformer 54 to accommodate any reasonable additional load on the "B" boost circuit without causing defocusing or decentering of the electron beam.

In further accordance with the present invention, the variable linearity control autotransformer 68, in order to properly shift the operating bias of the diode 70 to produce linearity in the resulting cathode ray beam deflection, will preferably have a primary to secondary turns ratio approximately equal to that of the autotransformer 54 under the conditions in which it is operated in the circuit shown. Hence its turns ratio will depend to a considerable extent upon the value of additional load imposed on the "B" boost circuit.

Moreover, the linearity of deflection on a wide angle flat faced image reproducing cathode ray tube requires that the deflection circuit contain a parabolic voltage component. In the arrangement of the present invention the magnitude of this parabolic connection component is properly adjustable by controlling the size of capacitor 64. Capacitors 67 and 69 may be adjusted in value to provide additional control over the deflection waveform.

In still further accordance with the present invention, it will be seen that the heater 76, cathode 74 and anode 72 are respectively connected at separate points $f$, $g$, and $h$ along the autotransformer winding. This novel arrangement reduces the effect of the stray capacity 75 associated with the secondary 77 of the heater transformer 79 for the damper 70. As discussed hereinabove, the connection of the heater 76 directly to the cathode 74 would impose the full capacity 75 across the winding $f$—$h$ and thereby greatly lower its resonant frequency. However, in accordance with the present invention, the heater 76 is returned to tap $g$ of the transformer winding $f$—$h$ so that the effects of the heater secondary capacity 75 across the winding $f$—$h$ is reduced by the square of the turns ratio ($f$—$h$) to ($g$—$h$). It will be noted that by tapping down the heater to tap $g$, the "flyback" pulse component appearing at the cathode 74 of the damper 70 will impose a greater net heater-cathode potential stress than would have obtained had the heater been connected with the cathode. Thus, the tap $g$ may be brought as close to the tap $h$ as the maximum heater filament rating of the damper 70 will permit. The closer the tap $g$ is to the tap $h$, of course, the greater will be the electromagnetic reduction of the heater to ground capacitive effects.

It is moreover important in the present invention to reduce the ratio of the winding $a$—$c$ to the winding $c$—$h$ to a figure substantially below that of prior art systems, indeed to a value which will restrict the flyback voltage appearing at the terminal $a$ to considerably lower values. This reduces the physical size of the winding $a$—$c$ and consequently the leakage reactance attributable to larger size windings. Since cyclic energization and de-energization of transformer leakage reactance results in considerable circuit loss, restriction of this winding to the low values mentioned will result in substantial and unexpected circuit economies. Moreover, reduction in the size of the winding $a$—$c$ reduces the overall stray capacity of the winding and hence results in a much higher impedance of the system.

Since the present invention has made possible a reduction in the effective capacity placed in shunt with the transformer winding, the free-resonant frequency of the magnetic system will be substantially higher, in fact, in practice, to a value in excess of that frequency whose period is twice the desired deflection retrace interval. Hence, it may be desirable in accordance with the present invention, to supplement the transformer stray capacity with a variable capacity such as 96, of a value which will permit substantial adjustment of the free-resonant frequency of the transformer and associated magnetic circuit. It will then be found that as the resonant frequency of the transformer is varied, the magnitude of the pulse appearing at the high voltage terminal $a$, will also vary thereby allowing the variable capacitor 96 to act as a beam accelerating potential control for the terminal 94. For a given amplitude of deflection current through the yoke 62, the capacitor 96 will then provide means for concomitantly adjusting the width and height of image raster. As indicated in dotted lines at 97, an additional width control in the form of an inductance 97 may be placed across any portion of the autotransformer, such as the winding 98, for giving control of the horizontal width independently of the vertical height. It should be borne in mind, however, that as described hereinbefore the use of the auxiliary width control 97 will result in lower circuit operating efficiency due to the losses within the inductance and the reduction of available deflection current.

The resulting high efficiency of the arrangement provided by the present invention makes it highly desirable to employ a high "Q" deflection yoke winding 60, which additional high "Q" provides problems not previously encountered with lower "Q" deflection yokes. For example, as is well known to those skilled in the art, the separate winding sections 60*a* and 60*b* of the yoke horizontal winding 60 will, due to the effects of stray circuit capacities 61*a* and 61*b*. exhibit substantially different free-resonant frequencies or ringing frequencies. This has been observed to produce undesirable transients in the developed deflection signal current through the yoke winding 60 and has, by prior art methods, been corrected by equalizing the effective winding sections capacities through the addition of a pader capacitor in shunt with the upper winding deflection section 60*a*. However, due to the high "Q" of the deflection yoke preferably used in the arrangement of Figure 1, the losses of the stray capacity 61*a* and 61*b* become appreciable, making the simple shunt connection of a pader capacitor across winding section 60*a* ineffective in fully removing the undesirable transients.

Therefore, in accordance with the present invention, a series combination of a capacitor 63 and resistance 64 is placed across the high side 60*a* of the horizontal deflection winding 60. The resistance 64 is so adjusted in value to balance the effective, now important, losses of the stray circuit capacities 61*a* and 61*b* in bridge fashion so that the phase of the ringing in each of the horizontal deflection winding sections 60*a* and 60*b* will be such to eliminate all transient effects. In practice, the value of this resistance, found to be quite critical, may, for conventional deflection yokes, be in the value of one thousand ohms or more.

From the foregoing it will be seen that the applicant has provided a simple, novel and effective deflection system which comprises a plurality of high-efficiency circuit arrangements which by themselves are novelly useful but are so related by the structure of the present invention to provide an over all deflection circuit of remarkable efficiency and capable of extraordinary waveform control. For instance, although profoundly important in the successive application of the width control capacitor 96, filament tapdown arrangement of the damper 70 may be advantageously employed in other circuits wherein the effects of heater-cathode capacity are to be reduced. Similarly, the utilization of the series correcting resistance 64, in conjunction with the pader capacitor 63 forming the balancing network across the yoke winding section 60*a*, forms a useful subcombination of the present invention but is for the successful operation of the high-efficiency arrangement shown in the figure, highly necessary.

It will be clear that although specific forms of desirable tubes have been indicated in the embodiment of the present invention, that other types having suitable characteristics may be readily substituted therefor and that the utility of the present invention is in no way limited to the various specific values and magnitudes of circuit parameters and operating currents cited hereinabove.

Having thus described my invention, what I claim is:

1. In an electromagnetic cathode ray beam deflection system of the type employing electromagnetic deflection yoke suitable for excitation by coupling to the anode-cathode circuit of a deflection output discharge tube, the combination of, an autotransformer having a portion of its winding directly connected in the anode-cathode circuit of the output discharge tube, means connecting the cathode ray deflection yoke in shunt with a portion of said autotransformer winding, a damping device having at least three electrodes, a connection from each of said damping device electrodes to separate points on said autotransformer winding whereby any capacitive effects associated with one of said damper electrodes will be electromagnetically attenuated in its effect on another of said damping device electrodes.

2. In an electromagnetic cathode ray beam deflection system of the type employing electromagnetic deflection yoke suitable for excitation by coupling to the anode-cathode circuit of a deflection output discharge tube, the combination of, an autotransformer having a portion of its winding directly connected in the anode-cathode circuit of the output discharge tube, means connecting the cathode ray deflection yoke in shunt with a portion of said autotransformer winding, a damping device having at least three elements a connection from each of said damping device elements to separate points on said autotransformer winding whereby any capacitive effects associated with one of said damper elements will be electromagnetically attenuated in its effect on another of said damping device elements.

3. In an electromagnetic cathode ray beam deflection system of the type employing electromagnetic deflection yoke suitable for excitation by coupling to the anode-cathode circuit of a deflection output discharge tube, the combination of, an autotransformer having a portion of its winding directly connected in the anode-cathode circuit of the output discharge tube, means connecting the cathode ray deflection yoke in shunt with a portion of said autotransformer winding, a damping device having at least a heater, cathode and anode electrode and a connection from each of said damping device electrodes to separate points on said autotransformer winding whereby any capacitive effects between said heater and said cathode will be electromagnetically attenuated in its effect on said deflection yoke.

4. In a cathode ray beam deflection circuit employing a deflection yoke suitable for excitation from a deflection output discharge tube the combination of a first autotransformer having a first and second magnetically coupled winding sections galvanically separable from one another, a second variable inductance autotransformer having a primary and second winding means for galvanically connecting said first autotransformer winding section with said second winding section, said means including said second autotransformer primary winding, a capacitor connected in series with said first autotransformer second winding section, connections placing the series combination of said first autotransformer first and second winding sections, said second autotransformer primary winding and said capacitor directly in series with the anode-cathode circuit of said deflection output discharge tube, connections placing the deflection yoke in shunt with said first autotransformer second winding section, and a damping device connected from said second autotransformer secondary winding to the output discharge tube cathode extremity of said capacitor.

5. Apparatus according to claim 2 wherein said damping device comprises a discharge tube having at least an anode, a cathode and heater element, the connections of said damping device being such that said cathode is connected with said second autotransformer secondary while said damping device anode is connected with said capacitor and wherein there is additionally provided a connection from said damping device heater to a point on said first autotransformer second winding section.

6. Apparatus according to claim 5 wherein said connection of said damping device heater element to said first autotransformer second winding section is at a point thereon substantially remote from the connection of said first autotransformer secondary winding with said second autotransformer primary winding.

7. In an electrical circuit, the combination of, an electrical potential datum, an inductance having a first, second and third taps thereon, said second and third taps defining progressively higher impedance levels along said inductance relative to said first tap, an electronic damping device having at least a heater, cathode, and anode, a connection from one electrode of said device other than said heater to the first tap on said inductance, a connection from the remaining damping device electrode other than said heater to the third tap on said inductance, means for supplying operating energy to said damping device heater, said energy supplying means sustaining an inherent capacity with respect to said potential datum, and a connection from said damping device heater to the second tap on said inductance, the impedance level between said second inductance taps and the tap to which said damping device cathode is connected being so adjusted relative to the characteristics of said damping device that the heater cathode rating thereof is not exceeded as a result of the inherent capacity sustained by said heater energy supplying means whereas the effects of said inherent capacity is electromagnetically attenuated relative to overall inductance.

8. In a cathode ray deflection system of the type employing electromagnetic deflection yoke suitable for coupling with the anode-cathode circuit of a deflection output discharge tube, an electromagnetic transformer having a primary winding and a secondary winding, said secondary winding having at least a first, second and third taps, said second and third taps defining successively higher secondary winding impedance relative to said first tap, a means for connecting the primary of said transformer in series with the anode-cathode circuit of the output discharge tube, means for connecting the electromagnetic deflection yoke in shunt with a portion of said transformer secondary winding, an electromagnetic damping device having at least a heater, cathode and anode, connections placing the damping device conduction path defined by said cathode and said anode between said secondary winding first and third taps, and a connection between said damping device heater and the second tap on said transformer secondary winding.

9. In a cathode ray beam deflection circuit incorporating an electromagnetic deflection yoke of the type suitable for excitation from a discharge tube having an anode and a cathode, the combination of, an autotransformer having a first and second electromagnetically-coupled winding sections galvanically separable from one another, an impedance connecting said transformer first winding section with said transformer second winding section, a connection from the upper portion of said first winding section to the anode of the output discharge tube, a capacitor connected between the lower portion of said transformer second winding section and said output discharge tube cathode, connections applying the deflection yoke in shunt with a portion of said transformer second winding section, and a damping device having an anode and a cathode connected in shunt with at least a portion of said transformer second winding section, said damping device cathode being connected with the upper portion of said second winding section while said damping device anode is connected with the output discharge tube cathode extremity of said capacitor whereby there is developed across said capacitor a terminal voltage representative of recovered energy cyclically stored in the inductive portions of the deflection apparatus.

10. Apparatus according to claim 9 wherein there is additionally provided connections for imposing an auxiliary direct-current load on the apparatus at the point of connection of the transformer second winding section and said capacitor and wherein there is provided in series with the connection to the deflection yoke a direct-current blocking capacitor thereby to prevent direct current established by said auxiliary load from passing through said deflection yoke.

11. Apparatus according to claim 9 wherein said impedance connecting the transformer first winding section with the transformer second winding section comprises a variable inductance having in shunt therewith a predetermined value of capacitance.

12. Apparatus according to claim 11 wherein said variable inductance has associated therewith a magnetically-coupled winding and connections placing said magnetically-coupled winding in series with said damping device.

13. Apparatus according to claim 12 wherein the turns ratio between said inductance winding and the winding magnetically associated therewith is substantially the same as the turns ratio between that portion of the autotransformer winding included between the discharge tube anode and cathode and that portion of the autotransformer winding embraced by said damping device.

14. In a deflection circuit for a cathode ray beam having associated therewith a deflection yoke suitable for excitation from a deflection output discharge tube having an anode and a cathode, an autotransformer having a portion of its winding connected between the anode and cathode of said output discharge tube, connections placing said deflection yoke in shunt with another portion of said autotransformer winding, damping means connected in shunt with said deflection yoke, an auxiliary high voltage pulse step-up winding magnetically-coupled to said autotransformer rectifying means connected across said high voltage pulse step-up winding such to develop a unidirectional potential in accordance with the characteristics of the pulse signal appearing across said pulse step-up winding, and a variable capacitor connected with said autotransformer for varying the self-resonant frequency thereof whereby the waveform inducted in said pulse step-up winding may be altered to provide control over the magnitude of the rectified D. C. potential.

15. Apparatus according to claim 14 wherein said autotransformer is constructed with sufficiently low stray winding capacity that the half period of free resonance of the transformer with said yoke and said diode connected thereacross is substantially shorter than the desirable retrace portion of the deflection cycle and wherein the range of said variable capacitor is made sufficiently large to permit adjustment of the connected autotransformer resonance to a frequency having a half period substantially equal to the desirable retrace time of the deflection cycle.

16. In a cathode ray beam deflection system, the combination of, an electromagnetic yoke having at least two sections serially connected with one another both winding sections having substantially the same inductance value, the first winding section having inherently imposed across it a lower value of stray circuit capacitance than the second winding section, each of said winding sections being of sufficiently high Q to cause the stray circuit capacitance to appear as having a resistance component, a capacitor connected in shunt with the deflection yoke first winding section, the value of said capacitor being such as to make free-resonant frequency of the first winding section substantially equal to the free-resonant frequency of the second winding section during operation of the yoke, and a resistance connected in series with said first capacitance, the value of said resistance being such to reflect the same relative resistance loss across the first winding section in connection with said capacitor as the relative resistance loss of said stray circuit capacity across said second winding section.

17. In an electromagnetic deflection system for a cathode ray tube, the combination of a source of deflection signal having output terminals exhibiting an inherent shunt capacitance, an electromagnetic deflection yoke having a first and second winding sections physically separated from one another and having substantially the same inductance value, connections placing said yoke winding sections in series with one another across said deflection signal source output terminals the shunt output capacitance thereof and the connections thereto thereby imposing more stray circuit capacitances across said yoke first winding section than across said yoke second winding section whereby each yoke winding section exhibits a different free resonant frequency, the two yoke winding sections being further of sufficiently high Q to cause the stray circuit capacitance imposed thereacross to appear as having a resistance component, a capacitor connected across said first winding section the value of said capacitor being such to cause the free-resonant frequency of the first winding section equal to the free-resonant frequency of the second winding section, and a resistance connected in series with said capacitor the value of which is sufficient to substantially balance the effective resistive losses imposed across each windings sections.

18. In a deflection system for a cathode ray tube having associated therewith an electromagnetic deflection yoke suitable for connection to the deflection output discharge tube having an anode and a cathode, an output transformer having a portion of its winding serially connected in the anode-cathode circuit of said output discharge tube, said first, second, and third impedance taps on said autotransformer winding, said second and third impedance taps representing progressively higher impedance values relative to said first tap, a damping device having a heater, cathode and anode, a connection from said damping device cathode to the third impedance tap, a connection from said damping device heater to said second impedance tap, a connection from said damping device anode to the first impedance tap of said transformer, connections for applying said deflection yoke in shunt with said damping device and a capacitor serially connected in said discharge tube anode-cathode circuit as well as in series with the damping device anode-cathode circuit and in series with said connection applying said deflection yoke in shunt with said damping device whereby there is developed at the output discharge tube anode extremity of said capacitor a positive unidirectional potential relative to the discharge tube cathode extremity of said capacitor.

19. Apparatus according to claim 18 wherein there is additionally provided utilization means connected to the output discharge tube anode extremity of said capacitor for drawing direct current from said capacitor and wherein there is provided an additional capacitor connected in series with said deflection yoke for preventing the direct current drawn from said other capacitor from passing through the deflection yoke.

20. In a cathode ray beam deflection system of the television variety employing an electromagnetic deflection yoke having vertical and horizontal deflection windings, each adapted for coupled excitation from the anode-cathode circuit of a vertical and horizontal deflection output discharge tube, an electromagnetic coupling device having primary winding taps and secondary winding taps, means for connecting the primary winding taps of said coupling device with the anode-cathode circuit of said horizontal deflection output discharge tube, means for connecting the secondary winding taps with the horizontal deflection winding of the deflection yoke, a damping discharge path connected in shunt with said horizontal deflection yoke winding, "B" boost power recovery means for cyclically recovering energy stored in said deflection yoke and applying said energy for increasing the existing anode-cathode potential in said horizontal output discharge tube, said "B" boost means comprising a storage element common to the horizontal output discharge tube anode-cathode circuit, the damping discharge path, and the horizontal deflection winding circuit connections, and connections from the most positive terminal of said storage device to the anode-cathode circuit of said vertical deflection output discharge tube for supplying operating energy thereto, the turns ratio between the winding embraced by said coupling device primary taps to said coupling device secondary being substantially defined by the ratio wherein the ratio of the transformer turns embraced by said primary connections to the transformer turns embraced by said second connections is proportional to the ratio of the average damper current to the average horizontal output discharge tube anode-cathode current for the conditions of 1-1 primary to secondary turns ratio multiplied by the ratio of the sum of the horizontal output discharge tube anode-cathode current and the vertical output discharge tube anode-cathode current to the value of the horizontal output discharge tube current.

21. Apparatus according to claim 20 wherein said electromagnetic coupling device comprises an autotransformer having a first and second magnetic-coupled but galvanically-separable winding section and variable inductance means connecting said first winding section with said second winding section, the resulting series combination of said first and second winding sections being considered as forming the primary winding of the coupled device and said second winding section forming a major portion of said secondary winding.

22. In a cathode ray beam deflection system of the television variety employing an electromagnetic deflection yoke having vertical and horizontal deflection windings, each adapted for coupled excitation from the anode-cathode circuit of a vertical and horizontal deflection output discharge tube, and electromagnetic coupling device having primary winding taps and secondary winding taps, means for connecting the primary winding taps of said coupling device with the anode-cathode circuit of said horizontal deflection output discharge tube, means for connecting the secondary winding taps with the horizontal deflection winding of the deflection yoke, a damping discharge path connected in shunt with said horizontal deflection yoke winding, "B" boost power recovery means for cyclically recovering energy stored in said deflection yoke and applying said energy for increasing the existing anode-cathode potential in said horizontal output discharge tube, said "B" boost means comprising a storage element common to the horizontal output discharge tube anode-cathode circuit, the damping discharge path and the horizontal deflection winding circuit connections, and connections from the most positive terminal of said storage device to the anode-cathode circuit of said vertical deflection output discharge tube for supply operating energy thereto, the turns ratio between the winding embraced by said coupling device primary taps to said coupling device secondary to primary being substantially defined by the expression $$\left[e^{\left(\frac{\pi}{2Q}\right)}\right]^2$$

where "$e$" is the base of the natural logarithm and "Q" represents the overall "Q" of the deflection circuit taken at a frequency having a half-period equal to the desired retrace period of the television deflection cycle multiplied by the ratio of the horizontal output discharge tube anode-cathode current to the sum of the horizontal output discharge tube anode-cathode current and the vertical output discharge tube current.

OTTO H. SCHADE.

REFERENCES CITED

The following references are of record in the file of this patent:

UNITED STATES PATENTS

| Number | Name | Date |
|---|---|---|
| 2,165,815 | Rhea | July 11, 1939 |
| 2,223,990 | Holmes | Dec. 3, 1940 |
| 2,265,620 | Bahring | Dec. 9, 1941 |
| 2,299,571 | Dome | Oct. 20, 1942 |
| 2,360,697 | Lyman | Oct. 17, 1944 |